United States Patent [19]

Conrad

[11] 4,095,605
[45] Jun. 20, 1978

[54] RECOVERY SYSTEM FOR USE WITH A BATCH PROCESS FOR INCREASING THE FILLING CAPACITY OF TOBACCO

[75] Inventor: Lucas Jones Conrad, Winston-Salem, N.C.

[73] Assignee: Reynolds Leasing Corporation, Jacksonville, Fla.

[21] Appl. No.: 720,022

[22] Filed: Sep. 2, 1976

[51] Int. Cl.² ............................................. A24B 3/18
[52] U.S. Cl. ................................ 131/134; 131/140 P
[58] Field of Search .......... 131/140 P, 140 C, 140 R, 131/120, 133 R, 133 A, 134

[56] References Cited

U.S. PATENT DOCUMENTS

| 3,524,451 | 8/1970 | Frederickson | 131/140 |
|---|---|---|---|
| 3,524,452 | 8/1970 | Moser et al. | 131/140 |
| 3,575,178 | 4/1971 | Stewart | 131/140 |
| 3,753,440 | 8/1973 | Ashburn | 131/140 |

Primary Examiner—Kyle L. Howell
Assistant Examiner—V. Millin
Attorney, Agent, or Firm—Grover M. Myers

[57] ABSTRACT

An apparatus for recovering vapors used in a processing system which expands tobacco to increase its filling capacity, including a tank having a supply of condensable compound in its liquid state and a less dense chilling liquid which is maintained at a temperature below the boiling point of the condensable compound and floats thereon. The upper portion of the tank is segregated into a condensor section which receives the vapors from the processing system and a compressor section for maintaining a selected pressure in the tank. A sparging header is provided within the chilling liquid to receive and introduce the vapors of the compound in the condensor section of the tank so that the vapors will be condensed and settle to the bottom of the tank.

10 Claims, 2 Drawing Figures

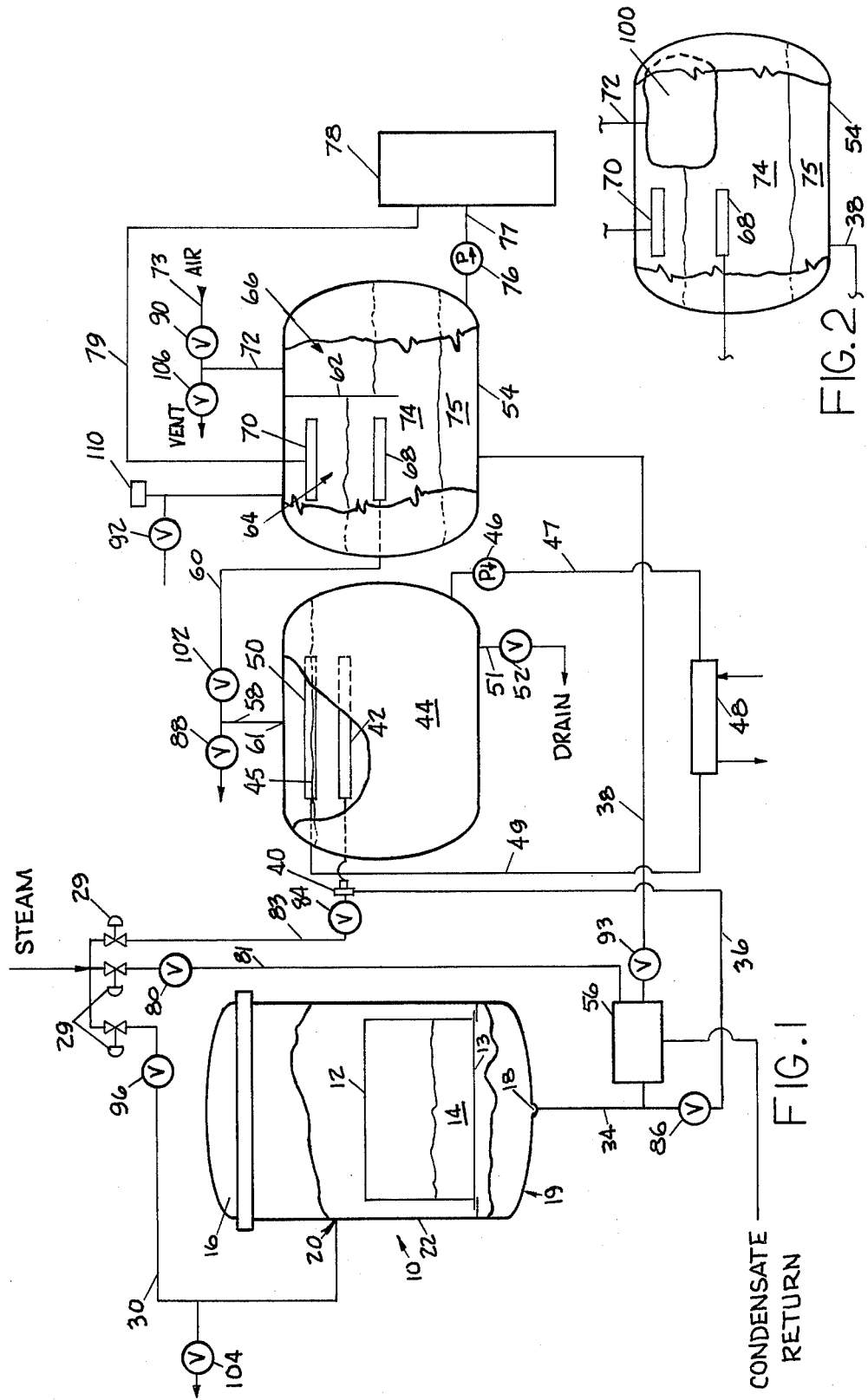

RECOVERY SYSTEM FOR USE WITH A BATCH PROCESS FOR INCREASING THE FILLING CAPACITY OF TOBACCO

BACKGROUND OF THE INVENTION

The present invention relates to an apparatus for recovering a volatile organic compound used in a process for increasing the filling capacity of tobacco. More particularly, the invention relates to an apparatus which will recover vapors used in a batch type process in which the batch of tobacco is impregnated with an organic compound then the tobacco is subjected to a stream of gas heated to a temperature above the boiling point of the organic compound impregnant whereby the impregnant is volatilized and the vapor given off is recovered and used again.

As is well known in the art, there are numerous processes for increasing the filling capacity of tobacco, and some of the known processes use a volatile organic compound to impregnate the tobacco and a hot gas to volatilize the organic compound and expand the tobacco. Previous embodiments of these processes are described in U.S. Pat. Nos. 3,524,451; 3,524,452; and 3,575,178. The latter two patents disclose processes which have a continuous in-feed and have been identified as "continuous processes."

Another of the presently known processes for increasing the filling capacity of tobacco is described in U.S. Pat. No. 3,753,440. This process is identified as a "batch process" because of its non-continuous nature. In the "batch process," a bed of tobacco is established in a hermetically sealed chamber which is vacuumized. The tobacco is contacted with the volatile organic compound which impregnates the tobacco and thereafter a drying gas is passed through the tobacco to remove a portion of water and the compound in the tobacco. Finally, a hot gas is passed through the bed of tobacco to volatilize the organic compound and, thus, expand the tobacco.

One of the aspects of utilizing a process such as the one described in the U.S. Pat. No. 3,753,440 is the recovery of the organic compound used to impregnate the tobacco. The present invention provides a unique recovery system in which a substantial amount of the organic compound can be recovered; furthermore, several items of equipment normally associated with a conventional recovery system are eliminated.

SUMMARY OF THE INVENTION

It is, therefore, an object of this invention to provide a recovery system for a commercial "batch process" for increasing the filling capacity of tobacco in which large quantities of tobacco can be processed during a single cycle.

Further and additional objects will be apparent from the following description, the accompanying drawing and the appended claims.

GENERAL DESCRIPTION OF THE INVENTION

In accordance with one embodiment of this invention, a process is provided in which a body or bed of tobacco is established in a vessel having a perforated bottom which will permit fluid to pass through the bed. The vessel carrying the tobacco is placed into a hermetically sealable chamber, and the chamber is sealed. A partial vacuum is applied to remove a portion of the occluded, non-condensable gas (i.e., air) from the tobacco. The vapors of an organic compound are passed into said chamber to pressurize it and condense on and in the tobacco. Thereafter, the chamber is allowed to equilibrate and the pressure in the chamber is reduced. Immediately after the pressure in the chamber reaches a desired level, a hot condensable gas (i.e., steam) is passed into contact with the tobacco to volatilize the impregnant in the tobacco, thereby expanding it. The volatilized impregnant passes from the chamber into a scrubber tank which removes the solid particle (i.e., tobacco) and the major portion of the hot condensable gas. The effluent of the scrubber tank is the vapor of the organic compound and any non-condensable gases (i.e., air). The effluent is passed from the scrubber tank to a recovery tank where the vapor of the organic compound is condensed and settles to the bottom of the tank. The recovery tank is divided into two portions — one portion acting as a condensing chamber and the other acting as a compression chamber which is used to decrease the volume of the gases in the condensor chamber and, thereby aids in condensing the vapors. The compressor chamber is also used as a pump to force the liquid organic compound from the recovery tank when it is required in the process.

Compounds or mixtures of compounds employed in the batch process for impregnating the tobacco are preferably ones which are organic in nature, and are chemically inert to the tobacco being treated. With the present embodiment of the recovery system described hereinafter, the impregnant should also have a density greater than the chilling fluid used in the recovery tank of the system so that the chilling fluid will float on the impregnant in its liquid status. The preferred chilling fluid is water.

Illustrative organic compounds which may be used to carry out this invention include methylene chloride, ethyl bromide, ethylidene chloride, trichlorofluoromethane, trichlorotrifluoroethane, 1,1,1-chlorodifluoroethane, 1,2-dichlorotetrafluoroethane, fluorodichloromethane and azeotropic mixtures of the above-mentioned compounds such as the trichlorofluoromethane-isopentane azeotrope. Compounds that are preferred are the non-oxygenated, organic compounds which are relatively non-polar in nature and are relatively or substantially immiscible in water. These preferred compounds, as a group, of relatively low specific heats and, thus, require only a low energy input to cause them to varporize and expand within the tobacco. Preferred materials are the hydrocarbons and the halogenated hydrocarbons within the group previously mentioned. Most preferred is trichlorofluoromethane because of its boiling point which permits the process to be carried out without excessive heating or cooling requirements and it has a density of 1.476.

BRIEF DESCRIPTION OF THE DRAWING

For a more complete understanding of this invention, reference will now be made to the accompanying drawing in which:

FIG. 1 is a schematic diagram of one embodiment of the processing apparatus including the impregnant recovery system in accordance with the present invention; and FIG. 2 is a modified embodiment of the recovery tank used in the recovery system in accordance with the present invention.

DESCRIPTION OF A PREFERRED APPARATUS

In FIG. 1, the numeral 10 indicates a chamber which receives a vessel or container 12 having a perforated bottom 13. The container carries a batch or bed of tobacco 14 which is to be treated. The chamber has a hermetically sealable lid 16 which permits the insertion and removal of the vessel from the chamber. The perforated bottom of the vessel allows the vapor and hot gas used in the process to pass through the bed of tobacco in either direction.

The chamber has a port 18 in its bottom 19 through which the chamber can be evacuated and through which vapors of an organic compound impregnant can be introduced into the chamber during the impregnation phase of the process. A second port 20 is provided in the sidewall 22 of the chamber so that the hot gas, preferably steam, used during the steaming or puffing phase of the process can be introduced into the chamber.

The steam source is shown in FIG. 1 as having three branches. Pressure regulators 29 are provided in the lines to regulate the steam pressure to the desired levels for the various functions for which the steam will be utilized (i.e., evaporating the organic compound for impregnation and puffing the tobacco, and energizing steam jets.).

The chamber is connected through port 18 to the impregnant supply and recovery equipment by outlet line 34, evacuation lines 36 and supply line 38. Evacuation line 36 is connected to steam jets 40 which, in turn, are connected to a lower sparging header 42 in a scrubber and moisture removal tank 44. The scrubber and moisture removal tank which carries a cooling fluid 45 receives the effluent from the chamber and removes any solid particles (i.e., tobacco), and any condensable gas (i.e., steam) which are condensable at the temperature of the cooling fluid, and cools any non-condensable gases and gas not condensable at the cooling fluid temperature. The preferred cooling fluid is water which is maintained at a temperature between about 45° to 60° C. The water in the scrubber tank is circulated by a pump 46 through line 47, heat exchanger 48, which can be of any known type such as one which utilizes a chilling tower (not shown), and line 49 to an upper sparging header 50 located above the sparging header 42. The effluent expelled from lower sparging header 42 is passed through a portion of the cooling fluid and is contacted by the spray emitted from sparging header 50. A drain line 51 with an appropriate valve 54 is provided in the bottom of the scrubber tank to permit removal of a sediment from the tank.

The supply line 38 is connected at one end to outlet line 34 and has its other end connected to a recovery tank 54. The volatile organic compound used as the impregnant in the process is stored in this tank as well as being recovered therein. A second heat exchanger 56 is carried on supply line 38; therefore, during the process, as the organic compound in a liquid state is supplied to the process, it is vaporized by the heat exchanger so that vapor enters the chamber. The recovery tank 54 is also connected through lines 58 and 60 to the outlet 61 of the scrubber tank 44.

Recovery tank 54 has a center baffle or divider 62 within the tank cavity which divides the upper part of the tank into a condensor portion or side 64 and a compressor portion or side 66. The condensor side of the tank has an output sparging header 68 which is connected to outlet 61 of the scrubber tank 44 through lines 60 and 58 and receives the effluent from the scrubber tank. A second sparging header or spray nozzle 70 is located above the output sparging header 68 and is utilized to condense the vapors as will be explained hereinafter. The recovery tank carries three fluids; the first fluid is a compressible, non-condensable gas such as air which is supplied to the compressor side of the tank through lines 72 and 73. It is preferred that the compressed air supply (not shown) have a pressure of about 90 psig. The second fluid 74 in the recovery tank is a chilling fluid which is used to condense the vapor from the effluent which enters the recovery tank. In this particular recovery system, this fluid must have a density less than the density of the impregnant compound so that it will float thereon. The level of the chilling fluid in the recovery tank is maintained above the end of the baffle so that the surface of the chilling fluid is always above the end of the baffle to prevent gas from passing under the baffle between the condensor and compressor sides. The temperature of the chilling fluid should be between about 3° to 59° C. The preferred chilling fluid is water and should be maintained at or below the boiling point of the impregnant compound used. Therefore, in this preferred embodiment, since the preferred impregnant is trichlorofluoromethane, the temperature of water is maintained at about 10° C. The temperature of the chilling fluid is maintained by circulating the water by pump 76 through line 77 to a chiller 78. The water is returned to the tank by line 79 and spray nozzle 70. The third fluid 75 in the tank is a volatile organic compound in its liquid state.

There are various other connecting lines and valves associated with this system which have not been described above. All of these elements will be described and their purpose disclosed in the description of the recovery system hereinafter.

FIG. 2 illustrates a modification to the recovery tank 54 by using an inflatable member or air bladder 100 connected to the inlet pipe 72 from the compressed air source. Such an inflatable member would not allow any of the condensable compound to enter the compressor section of the tank and, thereby prevent any loss of the condensable compound when the compressor section of the tank is vented, as will be explained hereinafter.

Recovery System

During the process mentioned previously, the volatile organic compound utilized to expand the tobacco must be recovered in order to make such a process commercially feasible. Other conventional systems might be utilized, but the present recovery system permits the volatile organic compound vapor and air mixture to be compressed by an external compressor which tends to decrease the amount of the organic compound used over the standard compressors used in other recovery systems. This system also reduces the cost of a recovery system because several items of a conventional recovery system are replaced by the recovery tank 54 used in the present system. For example, the recovery tank 54 acts as a compressor, a contact condensor, a pump, and a storage tank.

The recovery of the volatile organic compound begins during the impregnation step when the pressure in the chamber 10 is being maintained at its desired level. When valve 93 in the supply line 38 is closed to shut off the supply of vapor to the chamber during the impregnation step, valve 90 in the compressed air source line is closed, shutting off the 90 psig compressed air to the compressor side 66 of the recovery tank 54. Vent valve 106 which vents the compressor side 66 to atmosphere is open so that the pressure drops from 90 psig to about 20 psig, at which time valve 106 is closed. This reduces the pressure on the condensor side 64 of the recovery tank to facilitate venting.

Before recovery begins, the gas mixture on the condensor side 64 of the tank is predominantly air, even though there is some volatile organic compound vapor in the mixture. This air is exhausted from the system during the impregnation step by opening vent valve 92 on the condensor side of the recovery tank until the level control unit 110 detects water which closes valve 92. The level control 110 will operate valve 92 for a short period of time, opening and closing it until all gas is removed. The purpose of this step is to remove all non-condensable gas from the system. At a selected time, vent valve 92 is disabled and prevented from opening. At the same time vent valve 106 is again opened, allowing the compressor side 66 of the tank to equilibrate to atmosphere, then valve 106 is closed. The reason for closing valve 106 at this time is to recover the vapors and the air mixture under pressure which will reduce the volume of non-condensable gases collected and, therefore, the gases will not pass under the baffle 62 and escape to the compressor side of the tank.

After the impregnation step and while the chamber is being decompressed, valve 86 has been opened and then valve 102 in line 60 connecting the tank is opened. When vapors pass into the scrubber tank 44, the condensable fluids (i.e., water) and any solid particles are removed by bubbling the effluent up from header 42 through the cooling fluid 45 and by the cooling effect of the cool spray from header 50. The vapors of the volatile organic compound and the non-condensable gases which are cooled but not condensed then pass through outlet 61, lines 58 and 60 into the recovery tank 54 and are bubbled from the header 68 through the chilled fluid 74. A portion of the organic compound vapor is condensed from the mixture and settles to the bottom of the tank. The chilled spray from the spray nozzle 70 condenses most of the remaining vapors which also settle to the bottom of the tank.

As the pressure in the chamber is reduced, valve 84 to the steam jet is opened so that the steam jets can operate to evacuate the chamber. At this time vent valve 106 on the compressor side of the recovery tank is opened even though not all of the vapors have been recovered.

The steam jet 40 is operating during the entire process, thus, the recovery equipment described above functions in the same manner during each step of the process as has previously been described above with respect to the decompression step. The recovery system operates until the steam jet discontinues to function. Any vapors which remain in the condensor side of the recovery tank are recovered in the next cycle of the process during the impregnation step when the 90 psig air is used to compress the vapors to aid in their condensation.

As can be seen, the above-described and present invention provides a commercial "batch process" for increasing the filling capacity of tobacco with a novel impregnant recovery system which can recover the maximum amount of impregnant and which is much less expensive than the conventional systems.

The above-described recovery system can be modified in various ways, which will be apparent from the foregoing; however, variations and changes to the equipment used in the recovery system can be made in the above-described invention without departing from the true spirit and scope thereof, as defined in the following claims.

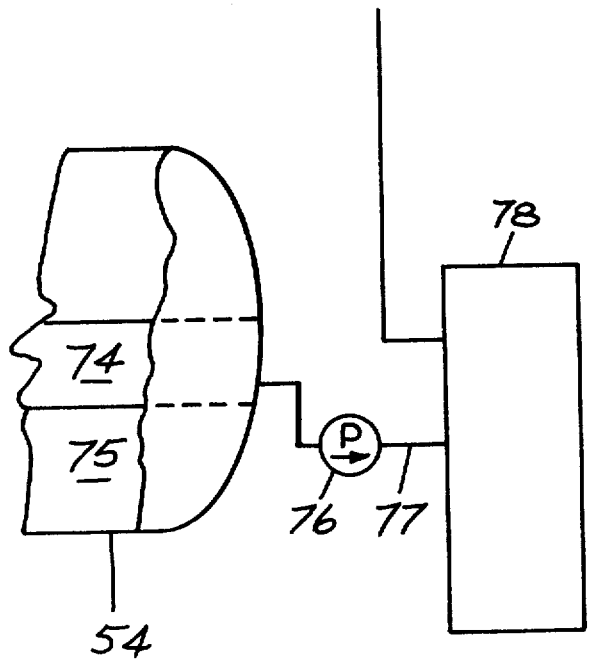

I claim:

1. An apparatus which can be used to store, supply and recover a condensable compound used in a processing system in a vaporous state comprising:
   (a) a closed tank having a supply of said condensable compound in its liquid state in the bottom of said tank and a chilling liquid supply less dense than the condensable compound floating on said compound.
   (b) means for separating the upper portion of the tank into a condensor and compressor section;
   (c) means for maintaining the chilling liquid at a selected temperature;
   (d) vapor introduction means for introducing said compound in its vapor state received from the processing system into the chilling liquid supply in the condensor section of the tank whereby the vapor passes through the chilling liquid and is condensed into its liquid state, the liquid compound settling to the compound supply at the bottom of the tank;
   (e) supply line connecting said tank to said processing system for delivering said compound in its liquid state to said processing system;
   (f) means for regulating and maintaining pressure in the compressor section of said tank to force the liquid compound from said tank as required; and
   (g) control means associated with said processing system to regulate the supply of said compound to said processing system.

2. The apparatus to claim 1, wherein said means for separating the upper portion of said tank into the condensor and compressor sections is a baffle extending downwardly from the upper inside surface of the tank into the chilling liquid a sufficient depth to maintain the lower end of the baffle below the surface of the chilling liquid.

3. The apparatus of claim 1, wherein said chilling liquid is water.

4. The apparatus of claim 1, further including:
   (a) a spraying device in the upper portion of the condensor section; and
   (b) means for circulating the chilling liquid between the chilling liquid supply in the tank and said spraying device to provide a spray of the chilling liquid to contact any vapors escaping from the surface of the chilling fluid supply whereby the escaping vapor is condensed and settles to the bottom of the tank in the liquid compound supply.

5. The apparatus of claim 1, further including means for venting non-condensable gases from said condensor section.

6. The apparatus of claim 1, further including:
   (a) a second closed tank connected between the first tank and said processing system for receiving the effluent from said processing system, said second tank containing a cooling liquid having a temperature above the boiling point of said compound;
   (b) means for introducing the effluent into said second tank, whereby any solid particles in the effluent are precipitated therefrom, and any gases condensable at the temperature of the cooling liquid are condensed from the effluent;

(c) means for maintaining the cooling liquid at a selected temperature; and
(d) a conduit for transporting the output of the second tank into the vapor introduction means of said first tank.

7. The apparatus of claim 6, wherein said cooling liquid is water.

8. The apparatus of claim 6, wherein said compound is an organic compound having a boiling point temperature of between about 4° and 60° C. at atmospheric pressure.

9. The apparatus of claim 8, wherein said temperature of the chilling liquid is between about 3° C. and 59° and the temperature of said cooling liquid is between 45° and 60° C.

10. The apparatus of claim 1, wherein said compound is an organic compound having a boiling point of about 4° to 60° C. at atmospheric pressure.

* * * * *

UNITED STATES PATENT OFFICE
CERTIFICATE OF CORRECTION

Patent No. 4,095,605           Dated June 20, 1978

Inventor(s) Lucas J. Conrad

It is certified that error appears in the above-identified patent and that said Letters Patent are hereby corrected as shown below:

In the drawings, FIG. 1, the end of line 77 which is connected to the recovery tank 54 should be located above the upper surface of the organic compound 75 in the area of the chilling liquid 74 as indicated on the attached sheet.

Signed and Sealed this

Twentieth Day of February 1979

[SEAL]

Attest:

RUTH C. MASON
*Attesting Officer*

DONALD W. BANNER
*Commissioner of Patents and Trademarks*

UNITED STATES PATENT OFFICE
CERTIFICATE OF CORRECTION

Patent No. 4,095,605                      Dated June 20, 1978

Inventor(s) Lucas J. Conrad

It is certified that error appears in the above-identified patent and that said Letters Patent are hereby corrected as shown below: